US007050187B1

(12) United States Patent
Fruth et al.

(10) Patent No.: US 7,050,187 B1
(45) Date of Patent: May 23, 2006

(54) REAL TIME FAX-OVER-PACKET PACKET LOSS COMPENSATION

(75) Inventors: Frank Fruth, Gaithersburg, MD (US); Shahid Aktar, Collage Park, MD (US); Jeff Wright, Germantown, MD (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/560,167

(22) Filed: Apr. 28, 2000

(51) Int. Cl.
*G06F 13/00* (2006.01)

(52) U.S. Cl. ..................................... 358/1.15; 358/442
(58) Field of Classification Search ............... 358/1.15, 358/426.01, 426.09, 426.1, 434, 442, 407; 379/100.01, 100.09, 100.13; 709/200, 217, 709/218
See application file for complete search history.

(56) References Cited

U.S. PATENT DOCUMENTS

| | | | | |
|---|---|---|---|---|
| 3,927,251 A | | 12/1975 | White et al. | 358/426.09 |
| 5,243,438 A | * | 9/1993 | Anderton et al. | 358/426.12 |
| 5,509,050 A | * | 4/1996 | Berland | 455/557 |
| 5,546,388 A | * | 8/1996 | Lin | 370/389 |
| 5,881,064 A | | 3/1999 | Lin et al. | 370/389 |
| 6,339,481 B1 | * | 1/2002 | Scott | 358/442 |
| 6,438,105 B1 | * | 8/2002 | Qarni et al. | 370/231 |
| 6,483,600 B1 | * | 11/2002 | Schuster et al. | 358/1.15 |
| 6,535,906 B1 | * | 3/2003 | Barber et al. | 709/200 |
| 6,559,980 B1 | * | 5/2003 | Joffe | 358/442 |
| 6,788,651 B1 | * | 9/2004 | Brent et al. | 370/255 |

FOREIGN PATENT DOCUMENTS

WO    WO 9848492    12/1998

\* cited by examiner

*Primary Examiner*—Joseph R. Pokrzywa
(74) *Attorney, Agent, or Firm*—Abdul Zindani; Wade James Brady, III; Frederick J. Telecky, Jr.

(57) ABSTRACT

A device and method for providing real time compensation for packet loss in the transmission of facsimile data over packet networks to avoid the generation of page loss data and the termination of facsimile transmission. Facsimile devices have a low tolerance for interruptions in transmission. Packet networks commonly have a transmission interruption rate above the tolerance of facsimile equipment. In order to compensate for transmission interruption, the present invention teaches the buffering of facsimile data by scan line at the receiving end, the evaluation of buffered scan lines for packet loss and the discarding of scan lines having packet loss to conceal the packet loss from the receiving facsimile equipment to avoid detection of page errors by the receiving facsimile equipment which could cause loss of facsimile transmission. Discarding damaged scan lines instead of repair or replacement saves computational time and storage capacity, allowing for real-time compensation to provide for optimal transmission.

13 Claims, 1 Drawing Sheet

REAL TIME FAX-OVER-PACKET PACKET LOSS COMPENSATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to facsimile transmission over packet networks. In particular, the present invention relates to the repair of scan line errors in fax over packet transmissions.

When dedicated facsimile devices communicate directly, a series of command signals are exchanged which allow the devices to communicate. The control information includes training to accommodate the speed and specifications available at both ends of the transmission and communications to ensure that the connection is not corrupted or interrupted. The exchange of data is direct, without delay or translation. Because of this direct connection, facsimile equipment is designed to function properly with a constant connection and not in an environment where the connection is intermittent or interrupted. If a facsimile device detects an interruption/error in transmission, the facsimile device interprets this as a transmission error and will time out and disconnect or attempt to retrain the current transmission. Retraining, if successful, will often result in a slower transmission speed in an attempt to avoid additional errors, hang-up and/or loss of transmission. Newer facsimile devices may also incorporate error correction mode capabilities which will compensate for limited interruption/error in transmission of image data.

When facsimile devices are connected through a packet network, they are not directly connected. The facsimile information is packetized at a sending end, sent over the packet network and reassembled into a facsimile format at the receiving end before presentation to the receiving facsimile device. The Connection over a packet network is not a constant connection and often experiences line delays, errors and/or packet loss which must be hidden from the facsimile device by a gateway in order to avoid error detection by a facsimile device attempting to communicate over a packet network.

Typically, low speed (T.30 hand shaking) control data is protected by simple redundancy techniques in fax over packet applications to combat network packet loss. The repetition of control data helps to insure that the facsimile devices receive an essentially uninterrupted control signal even in the event of packet loss, essentially fooling the facsimile device into believing that it has an uninterrupted direct constant connection to the facsimile device on the other side of the connection. The repetition of control data has negligible network bandwidth impacts because of the small size of control data and produces significant benefits to call success rates.

High-speed, large size, image data is not protected through repetition, because of undesirable increases in network bandwidth requirements. Prior to the present invention, the loss of image data causes page errors in the receiving facsimile device, causes loss of connection and excessive retraining which can significantly increase the time of transmission and loss of image data results in errors in the printed document. Error Correction Mode (ECM) employed by most newer fax devices can combat packet loss to a limited extent but may only result in the problems associated with excessive retraining and retransmissions.

In ECM mode of operation, when network packet loss exceeds two to three percent, ECM becomes ineffective and leads to consistent call failures when high-speed data is not protected over the network. When packet loss exceeds two to three percent, it has been observed that there is continuous data retransmission requests and re-trains. Eventually, the facsimile device gives up and terminates the call unsuccessfully. Disabling the ECM mode in packet loss environments exceeding two to three percent would improve performance.

In non-ECM modes of operation, the high-speed image packet loss translates to image errors at the receiving facsimile device. Newer facsimile devices will employ techniques to compensate for these page errors, but retrains can occur due to perceived bad line qualities. The retrains lead to longer call durations and as the number of pages to send via facsimile increases, so does the likelihood of a call failure due to excessive retrains. Also, in the field, poor legacy facsimile devices have been observed which cannot tolerate any received page errors. These facsimile devices terminate the call abruptly and go on hook in the middle of a page if packet loss occurs.

SUMMARY OF THE INVENTION

Based on the above described problems with facsimile over packet network transmission, the present invention teaches a method of improving facsimile over packet transmission performance in a packet loss environment. The device and method taught by the present invention achieves the following objectives:

The apparatus of the present invention minimizes implementation complexity and maintains high channel density.

The apparatus and method of the present invention conceals all page errors due to network packet loss from the receiving facsimile device for calls which do not employ ECM.

The apparatus and method of the present invention are compatible with a fax relay operation.

The apparatus and method of the present invention accomplishes the above objectives and the further benefits of the elimination of retrains due to packet loss which leads to improved facsimile performance.

Call success is improved with legacy facsimile devices that cannot tolerate page data errors with the apparatus and method taught herein. Because the invention is able to maintain minimal intervention so that only page errors due to network packet loss are concealed. Page errors due to equipment error or PSTN errors will be passed through and handled by the end point facsimile devices. The algorithm of the present invention operates in the re-modulating gateway with no dependencies on the demodulating gateway.

Overall page quality is still degraded due to packet loss, however, the call will not be terminated, resulting in over transmission success. The receipt of degraded facsimile is preferable to no receipt. If necessary, the recipient can request retransmission if the extent of degradation is unacceptable. The extent of degradation depends on the page content, e.g. text, pictures, density and the like. Therefore, call success rates are drastically improved.

BRIEF DESCRIPTION OF THE DRAWINGS

For a better understanding of the nature of the present invention, reference is had to the following figures and detailed description, wherein like elements are accorded like reference numerals, and wherein.

DETAILED DESCRIPTION OF PREFERRED EXEMPLARY EMBODIMENTS

In an non-ECM environment, only Modified Huffman MH and Modified Read MR page compression techniques are available. The algorithm of the present invention for concealing page errors due to packet loss is similar for Modified Huffman (MH) and Modified Read (MR) page compression modes.

Figure 1:
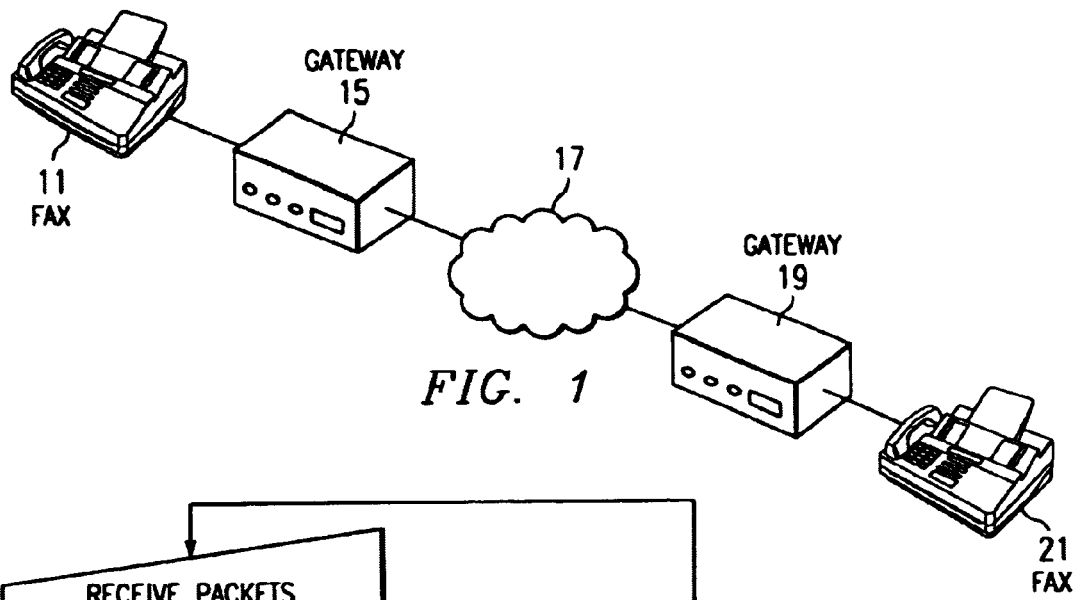
FIG. 1 is a diagram of the interconnection of facsimile over packet network.

FIG. 1 illustrates the connection of a first facsimile device 11 through a local gateway 15 to a packet network 17. At the other side of the packet network 17 is a gateway 19 and a second facsimile device 21. Prior to the implementation of the present invention, a facsimile transmission from facsimile device 11 is transmitted through gateway 15 where it is packetized and sent to packet network 17. Packet data is received from the packet network 17 by gateway 19 and reassembled in proper order in a buffer at the gateway 19. The image data was then played out from the buffer to the receiving facsimile device 21 as it was reassembled.

The facsimile device 21 assembles the image data into scan lines and prints the facsimile. In the event of packet loss, the image data played out to the receiving facsimile device 21 would contain errors because it is incomplete. The receiving facsimile device 21 would detect a page error and react accordingly.

Figure 2:
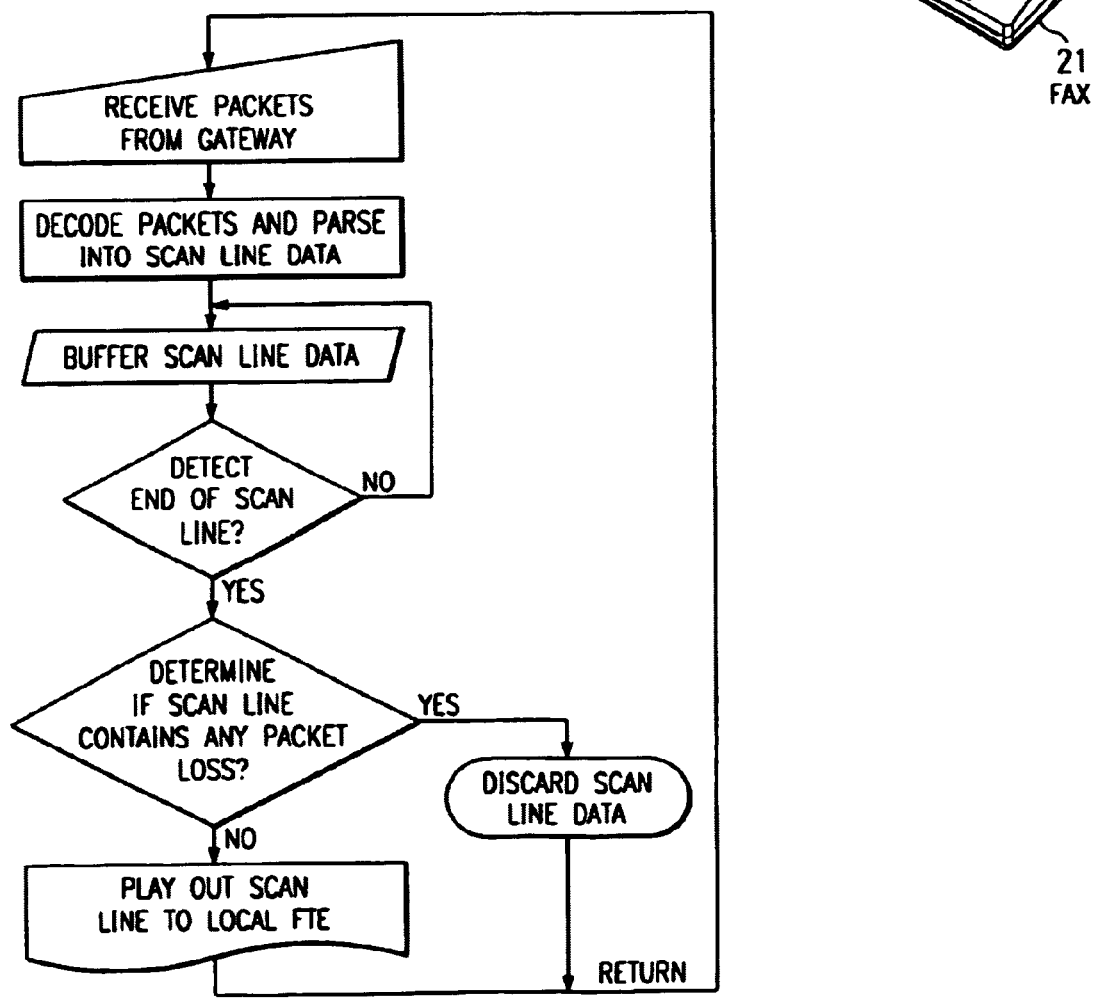
FIG. 2 is an exemplary logic flow diagram of the method of implementation of the present invention.

The scan line repair algorithm of the present invention is illustrated in FIG. 2. Image data received by gateway 19, from the packet network 17, is parsed into scan lines. The Scan line data is buffered and not played out to the local Facsimile Termination Equipment (FTE) 21 until the end of the scan line is expected with no packet loss.

If packet loss is expected before the end of the current scan line, the buffered scan line data is discarded and zero fill is played out to the local FTE 21, replacing the damaged scan line data.

In a first embodiment of the invention, the scan line(s) portion of the image lost due to packet loss is removed from the image and the remaining image is shifted up. This embodiment requires the least implementation complexity, and least additional storage. Reduction in computational complexity and storage requirements are desirable because they reduce costs.

In alternative embodiments, the lost scan lines can be replaced with blank lines or with a repetition of the previous scan line. Placing a blank scan line will provide the facsimile receiver with information indicating that a packet loss error was detected and compensated for. Implementation of alternative embodiments requires determination of the resolution of the received scan lines and a determination of the number of lost scan lines. In order to replay the last acceptable scan line, the apparatus must have the capacity to separately buffer that scan line or lines.

The algorithm continues playing out zero fill until the next scan line is detected. Once the receiving packets are synchronized to the start of a new scan line, the new scan line data is again buffered and the process is repeated.

The algorithm replaces scan line data in which packet loss occurs, concealing page errors from the receiving facsimile device.

The reduced code complexity is due primarily to the concept of scan line deletion as compared to replaying previous scan line data and/or lines. While repeating scan lines may in some instances improve printed page quality, it has greater code and data memory requirements and can cause a reduction in image quality dependant upon the image content.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

We claim:

1. A method for reducing facsimile page errors due to packet loss in facsimile transmission over a packet network, comprising:
   receiving facsimile image data packets from a packet network;
   reassembling said received packets;
   parsing said assembled packets into scan line data of said facsimile image;
   evaluating said scan line data to detect the expected end of a scan line without packet loss;
   playing out said scan line data to a local Facsimile Terminal Equipment (FTE), if said scan line data has no packet loss;
   discarding said scan line data if said scan line data has packet loss; and
   shifting a first scan line without packet loss and including a detected end of said first scan line, that is received in said FTE after said discarding, to join a second scan line without packet loss and including a detected end of said second scan line, that is received in said FTE before said discarding, to form a facsimile image.

2. The method of claim 1, further comprising:
   replacing said discarded scan line data with zero fill data; and
   playing out said zero fill data to said local FTE.

3. The method of claim 1, further comprising:
   replacing said discarded scan line data with scan line data defining a blank scan line.

4. The method of claim 1, further comprising:
   replacing said discarded scan line data with a repetition of data corresponding to the previous scan line.

5. The method of claim 1, further comprising:
   buffering said scan line data.

6. The method of claim 2, further comprising:
   continuing to provide zero fill data to said local FTE;
   monitoring said scan line data for the start of the next detected scan line;
   buffering said next detected scan line data;
   evaluating said next detected scan line data to detect the expected end of a scan line without packet loss;
   playing out said next detected scan line data to the local FTE if said scan line data has no packet loss; and
   continuing to provide zero fill data to said local FTE if said scan line data has packet loss.

7. The method of claim 1, further comprising:
   replacing said discarded scan line data with a repetition of data corresponding to the previous scan line.

8. A device for reducing facsimile page errors due to packet loss in facsimile transmission over a packet network, comprising:
- a gateway for receiving facsimile image data packets from a packet network; and
- a processor for reassembling said received packets, parsing said assembled packets into scan line data of said facsimile image, evaluating said scan line data to detect the expected end of a scan line without packet loss, playing out said scan line data to a local Facsimile Terminal Equipment (FTE), if said scan line data has no packet loss, and for discarding said scan line data if said scan line data has packet loss,
- wherein said processor shifts a first scan line without packet loss and including a detected end of said first scan line, that is received in said FTE after discarding data packets, to join a second scan line without packet loss and including a detected end of said second scan line, that is received in said FTE before said discarding, to form a facsimile image.

9. The device of claim 8, wherein said processor further replaces said discarded scan line data with zero fill data and plays out said zero fill data to said local FTE.

10. The device of claim 8, wherein said processor further replaces said discarded scan line data with scan line data defining a blank scan line.

11. The device of claim 8, wherein said processor further replaces said discarded scan line data with a repetition of data corresponding to the previous scan line.

12. The device of claim 8, further comprising a buffer for buffering said scan line data.

13. The device of claim 9, wherein:
- said processor further continues to provide zero fill data to said local FTE while monitoring said scan line data for the start of the next detected scan line;
- said buffer stores said next detected scan line data;
- said processor evaluates said next detected scan line data to detect the expected end of a scan line without packet loss, plays out said next detected scan line data to the local FTE if said scan line data has no packet loss, or continues to provide zero fill data to said local FTE if said scan line data has packet loss.

* * * * *